(12) United States Patent
Ezrielev et al.

(10) Patent No.: US 12,271,274 B2
(45) Date of Patent: Apr. 8, 2025

(54) APPLICATION-CENTRIC CYBER RECOVERY

(71) Applicant: Dell Products L.P., Round Rock, TX (US)

(72) Inventors: Ofir Ezrielev, Beer Sheva (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/937,949

(22) Filed: Oct. 4, 2022

(65) Prior Publication Data

US 2024/0111635 A1 Apr. 4, 2024

(51) Int. Cl.
*G06F 16/00* (2019.01)
*G06F 11/14* (2006.01)

(52) U.S. Cl.
CPC ...... *G06F 11/1469* (2013.01); *G06F 11/1456* (2013.01); *G06F 2201/84* (2013.01)

(58) Field of Classification Search
CPC ............. G06F 11/1469; G06F 11/1456; G06F 2201/84

USPC ......................................................... 707/651
See application file for complete search history.

(56) References Cited

U.S. PATENT DOCUMENTS

| | | | |
|---|---|---|---|
| 10,216,558 B1 | 2/2019 | Gaber et al. | |
| 10,489,301 B1* | 11/2019 | Visvanathan | G06F 12/0868 |
| 10,503,610 B1* | 12/2019 | Shemer | G06F 11/1464 |
| 11,829,261 B2* | 11/2023 | Radhakrishnan | G06F 11/1464 |
| 2020/0320208 A1* | 10/2020 | Bhosale | G06F 21/552 |
| 2021/0182253 A1* | 6/2021 | Quesnelle | G06F 11/2094 |
| 2021/0352085 A1* | 11/2021 | Reyes | H04L 63/20 |

\* cited by examiner

*Primary Examiner* — Monica M Pyo
(74) *Attorney, Agent, or Firm* — Workman Nydegger

(57) ABSTRACT

One method includes listening, by a storage vault, to a port that is specific to a particular data structure in the storage vault, determining that an air gap between the storage vault and an entity external to the storage vault, is closed, such that communication between the storage vault and the external entity, by way of the port, is enabled, signaling, by the storage vault to the external entity, that the air gap is closed, and receiving, at the storage vault by way of the port, data from the external entity.

18 Claims, 3 Drawing Sheets

APPLICATION-CENTRIC CYBER RECOVERY

FIELD OF THE INVENTION

Embodiments of the present invention generally relate to data protection and recovery. More particularly, at least some embodiments of the invention relate to systems, hardware, software, computer-readable media, and methods for recovering, on an application-specific basis, data stored in an air gapped vault.

BACKGROUND

It is often the case that the data of an enterprise or other entity may have varying priorities in terms of the need for protection. However, at least some data protection systems fail to account for the relative differences in priority as among the data that is backed up, or to be backed up.

Consider, for example, a case where backup data is stored in an air gapped vault. In such arrangements, the air gap must be closed from time to time in order to enable data to be written, that is, backed up, to the vault. In this example, relatively higher priority data may be backed up more frequently, thus requiring correspondingly frequent closures of the air gap. On the other hand, relatively lower priority data may be backed up less frequently, thus requiring only infrequent closures of the air gap.

A significant shortcoming of conventional approaches to the use of air gapped vaults is that closing of the air gap may expose all the data in the vault to attack, and not just the data in connection with which the air gap was closed. That is, any time the air gap is closed, all the data in the vault is vulnerable. This problem is aggravated by the relatively frequent air gap closures that are needed to support backup of priority data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
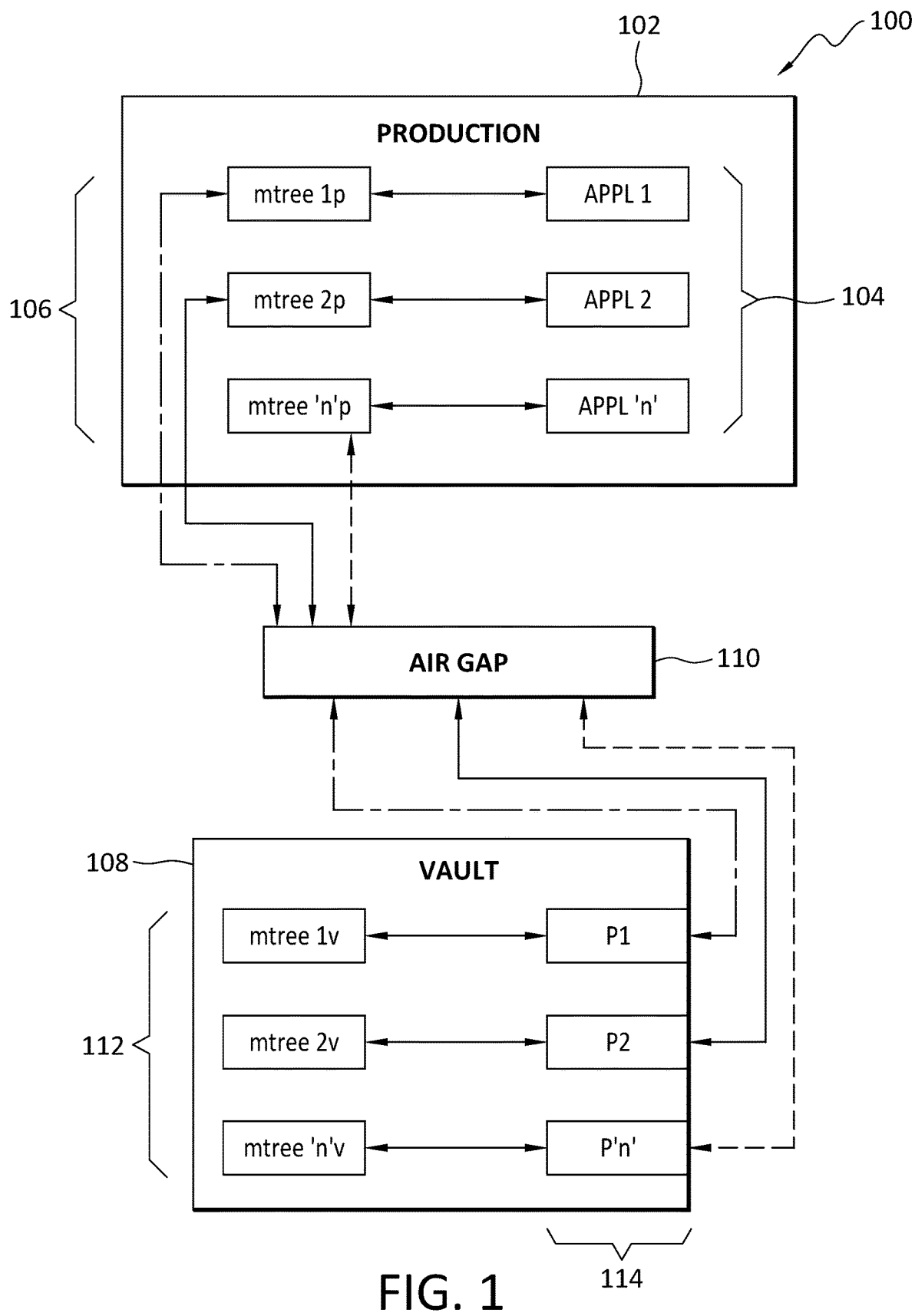
FIG. 1 discloses aspects of an example architecture according to an embodiment.

Embodiments of the present invention generally relate to data protection and recovery. More particularly, at least some embodiments of the invention relate to systems, hardware, software, computer-readable media, and methods for recovering, on an application-specific basis, data stored in an air gapped vault.

In general, an example embodiment of the invention may be employed in systems that include one or more air gapped vaults for the storage of data. One example of such a system is the Dell PowerProtect Cyber Recovery system, or simply 'CR,' although the scope of the invention is not limited to this particular system, or use case.

An embodiment may comprise an application-centric cyber recovery method. As noted earlier herein, conventional airgap policies are based on a particular time interval, such as "close airgap every X hours." This approach implies that all data has the same protection priority but that is not usually the case. For example, transactional data will likely be protected more frequently than other data. Thus, some embodiments of the invention comprise an application centric data recovery approach where the closing, and re-opening, of the air gap are controlled on a per-application basis. The control of the air gap configuration may be implemented on additional, or alternative, bases as well. For example, an embodiment may implement air gap control on a per-SLA (service level agreement) basis, where an SLA may correspond to a particular customer, for example.

Note that as used herein, an 'air gap' embraces a physical isolation, or separation, of a storage vault from any exterior system or device that may be susceptible to attack. That is, when the air gap associated with a vault is open, the air gapped vault is physically detached, and unconnected, from such exterior devices. As such, when the air gap is open, the air gapped vault is not accessible by any form of wireless, or hardwire, including optical, communication system or device. Conversely, when the air gap is closed, the vault, and some or all of its contents, may be accessible by external systems and devices, such as an application host for example, whether by wireless and/or hardwired communication channels.

In general, data to be protected in a system, such as CR for example, that includes an air gapped vault, or simply 'vault,' may be copied to an Mtree, that is, a deduplicated file system, on the production side where new/modified data is generated. The data in that MTree may then be replicated to a matching MTree in the vault when the airgap closes. Inasmuch as a production site may include an Mtree from which data may be replicated, by way of a dedicated network IP port, to a corresponding Mtree of a vault, an embodiment may effectively implement multiple independent airgaps between the production site and the vault.

Some embodiments of the invention may create multiple Mtrees, one per application, or per SLA or other basis, on the production side, along with creating matching MTrees in the vault. Each one of the MTrees in the vault may listen to a different respective IP port, that is, a communication port with a respective IP (internet protocol) address. This approach may thus enable separate control, such as on a per-application basis, over access to each one of the MTrees in the vault, effectively creating multiple independent air gaps which can be controlled independently and opened/closed possibly concurrently. Therefore, each Mtree may be associated with a respective airgap interval, or timing, according to the application whose data is included in the MTree.

Moreover, because a port may be application-specific, closing of the air gap may only enable access to the vault Mtree that corresponds to that application. Thus, even if an attacker were to gain access to that port, only the Mtrees corresponding to that application would potentially be vulnerable to the attacker.

Finally, each of these Mtrees in the vault may be able to be recovered independently. Thus, application prioritization for restore operations from the vault may also be implemented by some embodiments.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may enable selective access to data in an air gapped vault. An embodiment may enable access to vault data on a user-defined basis, such as application or SLA for example. An embodiment may reduce the amount of vault data that is vulnerable to attack, relative to approaches in which all data in the vault is vulnerable when an air gap is closed. An embodiment may enable multiple different entities, such as applications for example, to control the closing of an air gap associated with an air gapped vault. An embodiment may enable optimization of a time interval between data updates and their protection, and an embodiment may enable improvement of system RPO (recovery point objective, amount of data lost) as a function of the application importance. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. ASPECTS OF AN EXAMPLE ARCHITECTURE AND ENVIRONMENT

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, and storage environments such as the Dell PowerProtect Cyber Recovery system. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM).

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With attention now to FIG. 1, details are provided concerning an example architecture and environment, generally denoted at 100, in connection with which some embodiments may be implemented. The information disclosed in FIG. 1 is provided only by way of illustration, and is not intended to limit the scope of the invention in any way.

As shown, a production site 102 may include various applications 104, which may be of any kind, that may carry out operations including, but not limited to, data creation, data modification, data deletion, and data replication. To this end, the production site 102 may comprise one or more data structures 106, such as Mtrees for example, where data generated by the applications 104 may be stored until such time as that data can be backed up.

The production site 102 may communicate, such as on a selective basis, with a vault 108 by way of an air gap 110. In some embodiments, the vault 108 may comprise a Dell PowerProtect Cyber Recovery vault, but no particular vault is required. The vault 108 and part, or all, of its contents, may be isolated from the production site 102, and other external entities, when the air gap 110 is open. When the air gap 110 is closed, the vault 108 may be able to communicate with the production site 102 to transfer data, information, and metadata, for example, between the vault 108 and production site 102. As discussed in more detail below, the air gap 110 may, at any given time, be open for the purpose of one or more applications and their data, and at the same time, be closed for the purpose of one or more other applications and their data. Thus, while an air gap indicated at 110 is depicted in FIG. 1, it should be understood that there may be multiple possible different, and discrete, communication channels enabled, and collectively denoted, by that air gap 110.

With continued reference to FIG. 1, the vault 108 may comprise one or more Mtrees 112, each of which may correspond to a respective Mtree 106 at the production site 102. Thus, when the air gap 110 is open, data generated by the application(s) 104 may be stored at the production site 102 until such time as the air gap 110 closes, and that data can then be backed up to the corresponding Mtrees 112.

The vault 108 may further comprise one or more ports 114 by way of which the Mtrees 112 may be accessed when an air gap 110 connected to that port 114 is closed. As shown, each port 114 may be specific to a particular Mtree 112, or group of Mtrees. As such, the status of the air gap 110 as being 'open,' or 'closed,' may be made with reference to a specific port 114, or ports 114, such that, for example, when the air gap 110 to a port 114 is closed, the Mtree(s) 112 corresponding to that port 114, and only those Mtree(s) 112, may be accessible from the production site 102 by way of that port 114. Whether the ports 114 are elements of the production site 102, or of the vault 108, a respective air gap 110 between each of the ports 114 and the vault 108 may be individually controlled, that is, opened and closed, by the production site 102 and/or by the vault 108.

Note that a circumstance may arise in which the air gap 110 to one or more ports 114 may be closed and, at the same time, the air gap 110 to one or more other ports 114 may be open. Thus, access to the Mtrees 112 may be implemented for one or more applications 104 on a selective Mtree-by-Mtree basis, and/or other bases such as an SLA basis. In this way, access to the vault 108 may be implemented so to minimize the number of Mtrees 112 that may, potentially, be exposed to an attacker, since the air gap 110 is only closed for those port 114-Mtree 112 combinations to which access is required, for example, by an application 104, and the air gap remains open for the other port 114-Mtree 112 combinations.

It is noted that in another embodiment, the ports 114 may be elements of the production site 102, rather than being elements of the vault 108, and may otherwise operate as disclosed herein. In this embodiment, each of the ports 114 may correspond to a respective Mtree 106 of the vault 108 and, as noted elsewhere herein, the Mtrees 106 may each correspond to a respective Mtree 112 of the vault 108. Thus, the configuration shown in FIG. 1 is presented only by way of example, and is not intended to be limiting of the scope of the invention.

B. FURTHER OPERATIONAL ASPECTS OF SOME EMBODIMENTS

With continued attention to the example of FIG. 1, further information concerning some operational aspects of some embodiments is provided. With regard first to air gap 110 closures, such air gap 110 closures may be of varying frequency and duration, depending upon the circumstances concerning the data stored in the vault 108. To illustrate, if a particular application 104 requires daily backups, the air gap 110 to the port 114 corresponding to the Mtree(s) 112 implicated by that application may be closed on a daily basis. The duration of that closure may be fixed, or may vary depending, for example, on the amount of data to be backed up to the vault 108 and the bandwidth/communication speed between the production site 102 and the vault 108.

It is also noted that while reference is made herein to application-specific control of an air gap, the scope of the invention is not limited to air gap control on an application basis. More generally, control of the air gap may be implemented on a wide variety of resolutions. For example, the air gap may be controlled on any resolution finer than a datacenter-level resolution. Thus, an air gap may be controlled on one or more bases such as, but not limited to, a directory level, filesystem (FS) level, filetype level, or even an individual file level. Note that these are presented only by way of example, and are not intended to limit the scope of the invention in any way.

With regard to movement of data from a production site to the vault, such as from a production site Mtree to a vault Mtree, an application may, or may not, effect such movement. In an embodiment, the application does not perform movement of data from the production site to the vault. In one of such embodiments, the datacenter, or an element or component of the datacenter, may check, possibly continuously, a particular port of the vault, such as with a ping or other communication. Communication between the datacenter and the vault, by way of the port, may fail unless, or until, the datacenter determines that the air gap is closed. When the air gap is determined to be closed, the datacenter may then communicate with the port, at which time the datacenter may then copy, by way of the port, the data from one or more datacenter Mtrees to the corresponding Mtree(s) in the vault.

Control of the ports of a vault, or production site, may be handled by any of a variety of entities. For example, the opening and closing of an air gap between a port and a data source, such as a production site, and a data storage site, such as a vault, may be controlled by the vault and/or by the data source. In an embodiment, the vault may initiate a connection between the vault and the data source by closing the air gap, and then pulling data from the data source into the vault.

In an embodiment, control of the operation of an air gap may be passed from one entity, such as a vault, to another entity, such as a production site, or vice versa. More generally then, control of the operation of an air gap may be selectively assigned, and implemented.

In an embodiment, the vault may initiate a communication with the data source and/or the data source may attempt to communicate with the vault. Where the vault initiates the communication with the data source, the vault may be referred to as the 'active' side of the communication, and the data source as the 'passive' side of the communication. Conversely, where the data source attempts to communicate with the vault, the data source may be referred to as the 'active' side of the communication, and the vault as the 'passive' side of the communication. Note that these respective operations by the vault and the data source may be performed in parallel in an embodiment. Finally, these operations of the data source and the vault may be performed on a per-application, or other basis, examples of which are disclosed herein.

C. EXAMPLE METHODS

Figure 2:
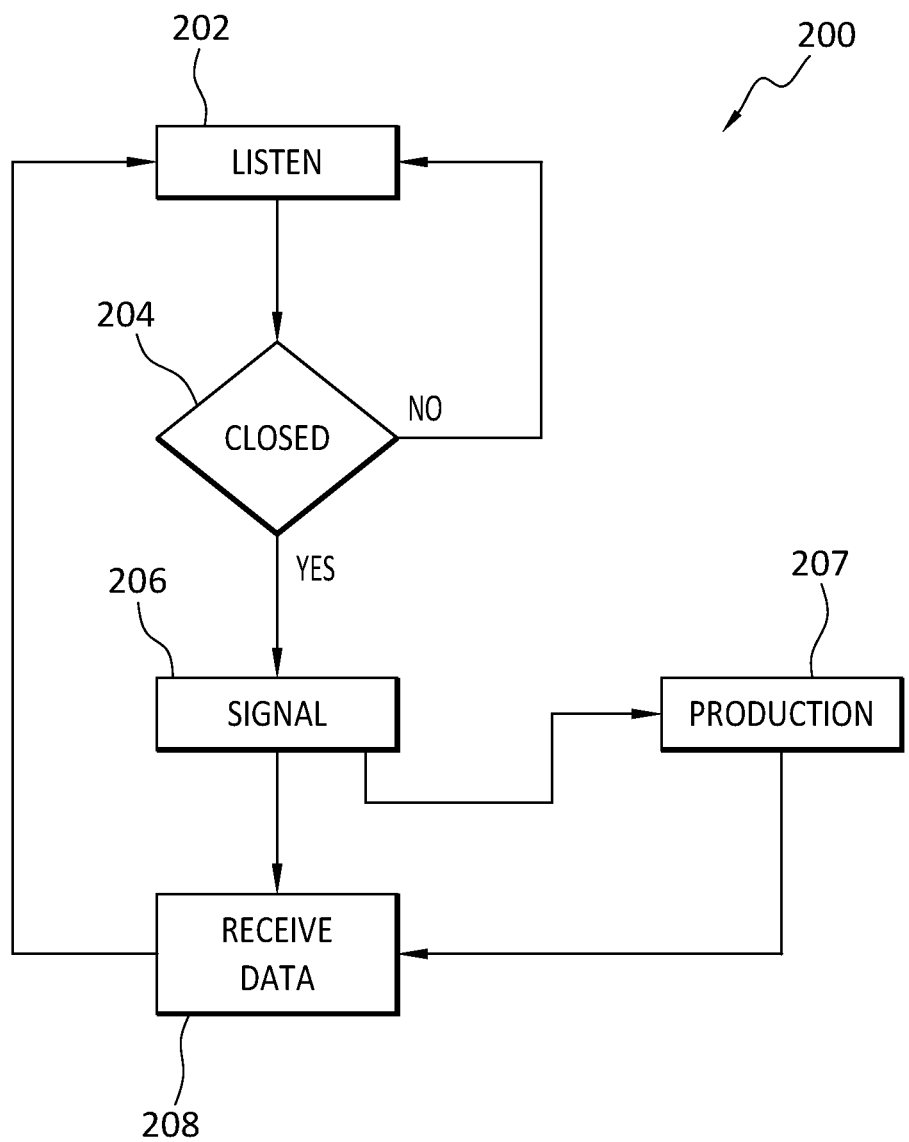
FIG. 2 discloses aspects of an example method according to an embodiment.

It is noted with respect to the disclosed methods, including the example method of FIG. 2, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to an embodiment is denoted generally at 200. In an embodiment, part or all of the method 200 may be performed at a vault, but that is not necessarily required.

The method 200 may begin when one or more data structures, such as Mtrees for example, listen 202 to respective ports of a vault. The listening 202 may be to determine whether or not communication is possible by way of the port. The listening 202 may comprise periodically pinging the port, and/or may comprise determining if a communication is being, or has been, received by way of the port.

As a result of the listening 202, a determination 204 may then be made as to whether or not an air gap between the vault and another site, such as a production site, is closed, such that communication between the vault and the other site, by way of the port, is possible. If communication by way of the port is not possible, indicating that the air gap is not closed, the method 200 may return to 202. On the other hand, if communication by way of the port is determined 204 to be possible, indicating that the air gap between the vault and other site is closed, the listening entity, such as an Mtree, may then transmit, by way of the port, a signal 206 to the other site, through the closed air gap. The signal 206 may indicate to the other site, such as a production site 207 for example, that the air gap is closed. The vault may then receive 208 data from the other site until such time as the air gap is reopened, or reestablished. After the air gap has been reopened, the method 200 may return to 202.

D. FURTHER EXAMPLE EMBODIMENTS

Following are some further example embodiments of the invention. These are presented only by way of example and are not intended to limit the scope of the invention in any way.

Embodiment 1. A method, comprising: listening, by a storage vault, to a port that is specific to a particular data structure in the storage vault; determining that an air gap between the storage vault and an entity external to the storage vault, is closed, such that communication between the storage vault and the external entity, by way of the port, is enabled; signaling, by the storage vault to the external entity, that the air gap is closed; and receiving, at the storage vault by way of the port, data from the external entity.

Embodiment 2. The method as recited in embodiment 1, wherein the data structure comprises an Mtree that corresponds to an Mtree in the external entity.

Embodiment 3. The method as recited in any of embodiments 1-2, wherein the data structure corresponds to a particular application running at the external entity.

Embodiment 4. The method as recited in any of embodiments 1-3, wherein opening and closing of the air gap is controlled by the storage vault.

Embodiment 5. The method as recited in any of embodiments 1-4, wherein when the air gap is closed, the port enables communication only between the external entity and the data structure of the storage vault, and no other data structures of the storage vault are accessible by way of the port when the air gap is closed.

Embodiment 6. The method as recited in any of embodiments 1-5, wherein the data is received from a particular data structure of the external entity.

Embodiment 7. The method as recited in any of embodiments 1-6, wherein the received data is stored in a data structure that corresponds to a particular data structure and/or application at the external entity.

Embodiment 8. The method as recited in any of embodiments 1-7, wherein data structure in the storage vault is one of a group of data structures, each of which corresponds to a respective application, or service level agreement.

Embodiment 9. The method as recited in any of embodiments 1-8, wherein data structure in the storage vault is one of a group of data structures, each of which listens to a different respective port.

Embodiment 10. The method as recited in any of embodiments 1-9, wherein data structure in the storage vault is one of a group of data structures, and access, by the external entity, to the data structures is implemented on an individual data structure basis.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
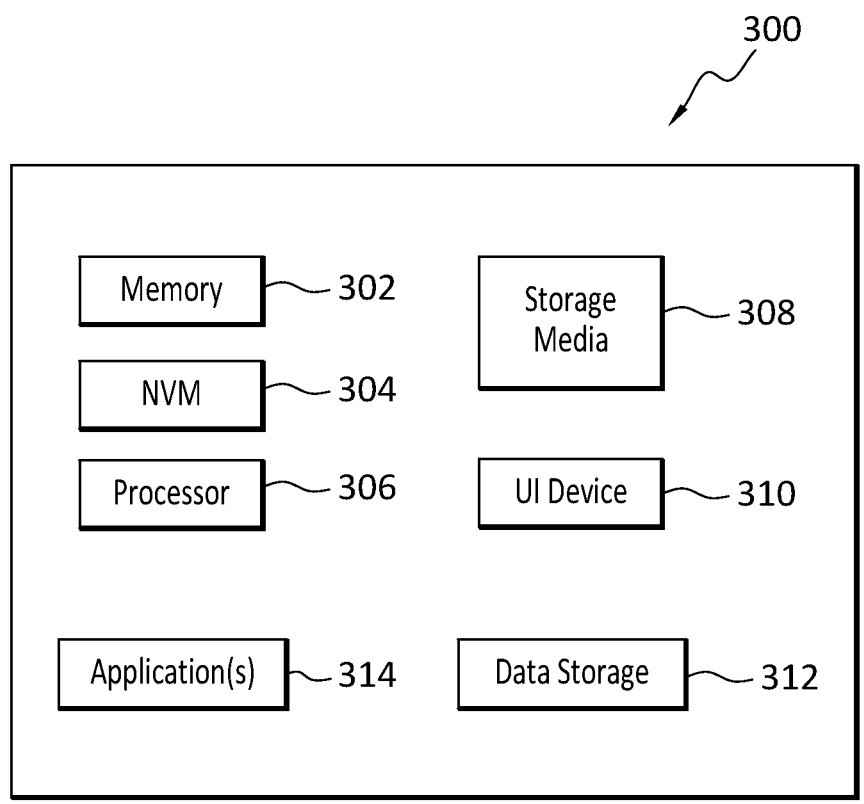
FIG. 3 discloses aspects of an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    listening, by a storage vault that is an element of a computing system, to a port that is specific to a particular data structure in the storage vault;
    determining, by the storage vault, that an air gap between the storage vault and an entity external to the storage vault, is closed, such that communication between the storage vault and the external entity, by way of the port, is enabled, and wherein when the air gap is closed, the port enables communication only between the external entity and the particular data structure of the storage vault, and no other data structures of the storage vault are accessible by way of the port when the air gap is closed;
    signaling, by the storage vault to the external entity, that the air gap is closed; and receiving, at the storage vault by way of the port, data from the external entity.

2. The method as recited in claim 1, wherein the particular data structure comprises an Mtree that corresponds to an Mtree in the external entity.

3. The method as recited in claim 1, wherein the particular data structure corresponds to a particular application running at the external entity.

4. The method as recited in claim 1, wherein opening and closing of the air gap is controlled by the storage vault.

5. The method as recited in claim 1, wherein the data is received from a particular data structure of the external entity.

6. The method as recited in claim 1, wherein the received data is stored at the storage vault in a data structure that corresponds to a particular data structure and/or application at the external entity.

7. The method as recited in claim 1, wherein the particular data structure in the storage vault is one of a group of data structures in the storage vault, each of which corresponds to a respective application, or service level agreement.

8. The method as recited in claim 1, wherein the particular data structure in the storage vault is one of a group of data structures, each of which listens to a different respective port.

9. The method as recited in claim 1, wherein the particular data structure in the storage vault is one of a group of data structures, and access, by the external entity, to the data structures is implemented on an individual data structure basis.

10. A non-transitory storage medium having stored therein instructions that are executable by one or more hardware processors to perform operations comprising:
listening, by a storage vault, to a port that is specific to a particular data structure in the storage vault;
determining, by the storage vault, that an air gap between the storage vault and an entity external to the storage vault, is closed, such that communication between the storage vault and the external entity, by way of the port, is enabled, and wherein when the air gap is closed, the port enables communication only between the external entity and the particular data structure of the storage vault, and no other data structures of the storage vault are accessible by way of the port when the air gap is closed;
signaling, by the storage vault to the external entity, that the air gap is closed; and
receiving, at the storage vault by way of the port, data from the external entity.

11. The non-transitory storage medium as recited in claim 10, wherein the particular data structure comprises an Mtree that corresponds to an Mtree in the external entity.

12. The non-transitory storage medium as recited in claim 10, wherein the particular data structure corresponds to a particular application running at the external entity.

13. The non-transitory storage medium as recited in claim 10, wherein opening and closing of the air gap is controlled by the storage vault.

14. The non-transitory storage medium as recited in claim 10, wherein the data is received from a particular data structure of the external entity.

15. The non-transitory storage medium as recited in claim 10, wherein the received data is stored at the storage vault in a data structure that corresponds to a particular data structure and/or application at the external entity.

16. The non-transitory storage medium as recited in claim 10, wherein the particular data structure in the storage vault is one of a group of data structures in the storage vault, each of which corresponds to a respective application, or service level agreement.

17. The non-transitory storage medium as recited in claim 10, wherein the particular data structure in the storage vault is one of a group of data structures, each of which listens to a different respective port.

18. The non-transitory storage medium as recited in claim 10, wherein the particular data structure in the storage vault is one of a group of data structures, and access, by the external entity, to the data structures is implemented on an individual data structure basis.

* * * * *